Patented Apr. 18, 1950

2,504,618

UNITED STATES PATENT OFFICE 2,504,618

PROCESS FOR PRODUCING ALCOHOLS

Raymond C. Archibald, Berkeley, and Robert A. Trimble, El Cerrito, Calif., assignors to Shell Development Company, San Francisco, Calif., a corporation of Delaware No Drawing. Application October 3, 1947, Serial No. 777,844

6 Claims. (Cl. 260—641)

This invention relates to a process for producing alcohols, and it is particularly directed to the provision of a novel catalyst for use in the reaction by which olefins are converted by direct hydration into the corresponding alcohols.

While the present invention finds application in the synthesis of a variety of alcohols, it finds the widest utility in processes whereby ethylene is directly hydrated to ethanol. Accordingly, the invention will be described as it relates to the said ethylene hydration processes, though without limitation thereto.

It is known to react ethylene and water to produce ethanol, the reaction proceeding in an efficient manner when conducted at elevated temperatures and superatmospheric pressures, and in the presence of a suitable catalyst. While a variety of such catalysts are known, many of the more efficient ones are relatively expensive and have a comparatively short life. In any event, with the ever-increasing demand for ethanol there is a need for still other catalytic materials, particularly those which not only function in a highly efficient manner, but are inexpensive, easy of preparation and have a long life under actual operating conditions.

It has been discovered that activated montmorillonite which has been treated with hydrofluoric acid and thereafter calcined, comprises an excellent catalyst for use in processes for the direct hydration of olefins, and particularly in the manufacture of ethanol from ethylene by this method. This catalyst is not only efficient in its operation, but has the advantage of being produced from materials at a relatively low cost. Further, it is characterized by a long life under actual operating conditions, and when exhausted may readily be renewed.

Montmorillonite is a clay of the bentonite type, and large deposits thereof are found in various parts of the United States, as well as in other sections of the world. "Activated montmorillonite" is a material which is prepared in a known manner by treating the montmorillonite clay with an acid, sulfuric acid being the material generally employed for this purpose. Following treatment with the acid, the clay is washed and dried. Representative montmorillonite activating processes are described in U. S. Patents 1,379,113 and 1,642,871, and reference is hereby made to said patents for a more complete description of suitable activation procedures.

In providing the catalyst used in the present invention, the previously activated montmorillonite, whether in powder or aggregate form, is impregnated with a solution of hydrofluoric acid and is thereafter subjected to calcination at elevated temperatures. The strength of impregnating acid is an important factor, and it may range from 6 to 10%. It is preferred that the hydrofluoric acid solution have a strength of 8%. The amount of impregnating acid employed should be sufficient to provide from 5 to 15% hydrogen fluoride (HF) in the product on a dry weight basis, and it is preferred that the product contain from 8 to 12% HF. Activated montmorillonite, even though previously dried, normally has a residual water content the amount of which varies from lot to lot and may be determined by conventional analytical procedures when not supplied by the manufacturer. Knowing the original water content of the material, the amount of any particular hydrofluoric acid solution necessary for the provision of a given percentage of HF in the material may readily be determined, for little, if any, loss of HF will occur during subsequent processing steps.

Considerable heat is evolved when the hydrofluoric acid solution comes into contact with the activated montmorillonite. This is evidence of an exothermic reaction, the nature of which is not clearly understood. By it, however, a large part of the HF in the mixture is converted to a fixed, non-volatile form. In the ensuing calcination step, the HF which is not already in the fixed condition, is converted to that state, and at the same time, all water present is eliminated. Calcination also improves the physical condition of the catalyst, it being set into a hardened state well adapted to resist disintegration in subsequent use.

Reference has been made above to impregnating the activated montmorillonite with hydrofluoric acid and subsequently calcining the product. Calcination may be carried out by heating the impregnated material to a temperature above 300° C. for a period of at least one-half hour, and preferably for one or more hours. Even lower temperatures, as 200° C., may be employed provided the heating period be sufficiently prolonged. In the preferred practice of our invention, the material is subjected to calcination at a temperature between 400° C. and 600° C. for from 1 to 10 hours.

When practicing this invention, a gaseous mixture of ethylene and water vapor are passed through the catalyst, prepared as described above, at an elevated temperature and a superatmospheric pressure. The temperature of the bed should be maintained within the range 250° C. to 350° C., a preferred bed temperature being from 270° C. to 310° C. The total pressure within the system should be at least 500 p. s. i., though much higher pressures, as from 3000 to 5000 p. s. i., are frequently used. In general, when operating at the higher pressures, as 4000 p. s. i., for example, it is desirable to supply the reactant gases in a water vapor/ethylene mole ratio of from about 0.2 to 0.3, whereas at lower pressures, as 1000 p. s. i., this ratio should be increased so as to fall within the range 0.5 to 0.75.

The rate at which the influx gases are fed through the catalyst bed is not critical, the preferred practice being to supply from about 100 to 250 moles of the reactant gases, per liter of catalyst, per hour of operation.

The ethanol produced as a result of the hydration reaction is recovered from the gaseous effluent emerging from the catalyst bed by passing said effluent through a suitable condensing device where the alcohol and water vapor present are converted to liquid form. Any unreacted ethylene gas is recycled from the condenser through the system for admixture with additional quantities of ethylene and water vapor, the process thereby being carried on in a continuous manner.

Through use of the montmorillonite catalytic material described herein, it is possible to obtain relatively high yields of ethanol, the liquid solution obtained on condensing the effluent gases normally containing between 15% and 20% by weight ethanol. This compares with a percentage of but 5% to 10% obtained with the less efficient types of catalysts. Further, it is important to note that the catalyst may be maintained in continuous use for relatively long periods of time without suffering more than but slight diminution in activity. When the catalyst does eventually lose a large part of its effectiveness, full activity may be restored by repeating the hydrofluoric acid impregnation and calcination steps outlined above.

The following examples will serve to illustrate the manner in which the present invention finds application.

Example I

In this operation ethylene was converted into ethanol by the method of direct hydration effected in the presence of a catalyst prepared by impregnating powdered, activated montmorillonite with an aqueous solution of hydrofluoric acid of 8% strength. The wet material so obtained was given a primary drying treatment and the resulting dried mass was broken up and compressed into small pellets. These pellets, in turn, were calcined at a temperature of 550° C. for a period of 10 hours. The calcined product, which comprised the finished catalyst, contained approximately 10% by weight HF combined with the base material in a non-volatile form. This amount of HF was substantially the same as that which was originally introduced into the material by impregnation with hydrofluoric acid, thereby evidencing the fact that little, if any, loss of HF occurred during the preliminary drying and subsequent calcination, steps.

The catalyst was then supported within the reaction chamber of a hydrating unit and there maintained at a temperature of 300° C. The vaporized reactants were passed through the catalyst in a water/ethylene mole ratio of 0.29 and at the rate of 36 moles of water and 122 moles of ethylene per liter of catalyst per hour, the total pressure within the system being 4000 p. s. i. Throughout the period of this test, which extended over several hours, the activity of the catalyst remained substantially unimpaired, an average of 0.17 liter of alcohol being produced per liter of catalyst per hour of operation. The gaseous effluent on being condensed yielded an aqueous solution containing 19.4% by weight ethanol, an amount which compares favorably with that obtained through use of any other known catalyst.

Example II

For the sake of comparison an ethylene hydration operation was conducted using as catalyst activated montmorillonite material (in the form of $\frac{3}{16}$" dia. x $\frac{1}{8}$" pellets) which had not been impregnated with any HF acid but which had been calcined for 10 hours at 550° C.

The conditions of the ethylene hydration step were the same as those described above in Example I, but in this case only 0.06 liter of ethanol was produced per liter of catalyst per hour of operation, and the condensate contained but 6.9% by weight ethanol.

While the foregoing description has been largely directed to a method utilizing the novel catalyst herein described in the direct hydration of ethylene, the catalyst also finds utility in hydration processes whereby olefins are converted into ethers, as ethylene into diethyl ether. Further, the HF treated and calcined activated montmorillonite catalyst described herein proves to be surprisingly well adapted for use in various hydrocarbon cracking operations, as in the conversion of the higher hydrocarbons into those containing from 3 to 10 carbon atoms.

We claim as our invention:

1. In a process of preparing ethanol, the step comprising reacting ethylene and water vapor at a temperature between 270° and 310° C. and at a pressure above 500 p. s. i. in the presence of a catalyst containing 10% by weight HF, said catalyst having been produced by impregnating activated montmorillonite with an 8% solution of hydrofluoric acid and calcining the resulting impregnated product at a temperature above 400° C. for at least one hour.

2. In a process of preparing ethanol, the step comprising reacting ethylene and water vapor at a temperature between 270° C. and 310° C. and at a pressure above 500 p. s. i in the presence of a catalyst produced by impregnating activated montmorillonite with hydrofluoric acid of from 6 to 10% strength and calcining the resulting impregnated product at a temperature between 400° C. and 600° C. for at least one hour, the amount of hydrofluoric acid employed being sufficient to provide the activated montmorillonite with from 8% to 12% HF on a dry weight basis.

3. In a process of preparing ethanol, the step comprising reacting ethylene and water vapor at a temperature between 250° C. and 350° C. and at a pressure above 500 p. s. i. in the presence of a catalyst produced by impregnating activated montmorillonite with hydrofluoric acid of from 6 to 10% strength and calcining the resulting impregnated product at a temperature above 300° C. for at least one-half hour, the amount of hydrofluoric acid employed being sufficient to provide the activated montmorillonite with from 5% to 15% HF on a dry weight basis.

4. The process of preparing ethanol which comprises reacting ethylene and water in the presence of a catalyst produced by impregnating an activated montmorillonite base material with hydrofluoric acid of from 6 to 10% strength, and calcining the resulting impregnated product to produce a dry material containing from 5% to 15% by weight HF.

5. The process of preparing an alcohol which comprises reacting an olefin and water in the presence of a catalyst produced by impregnating an activated montmorillonite base material with hydrofluoric acid of from 6 to 10% strength, and calcining the resulting impregnated product to produce a dry material containing from 5% to 15% by weight HF.

6. In a method for the direct hydration of olefins, the step comprising effecting hydration of the olefin in the presence of an HF treated, activated montmorillonite catalyst, said catalyst having been produced by impregnating an activated montmorillonite base material with hydrofluoric acid of from 6 to 10% strength, and calcining the resulting product to produce a dry material containing from 5% to 15% by weight HF.

RAYMOND C. ARCHIBALD.
ROBERT A. TRIMBLE.

REFERENCES CITED

The following references are of record in the file of this patent:

UNITED STATES PATENTS

| Number | Name | Date |
|---|---|---|
| 2,014,740 | Larson | Sept. 17, 1935 |
| 2,135,455 | Loder | Nov. 1, 1938 |
| 2,173,187 | Tanner | Sept. 19, 1939 |
| 2,355,868 | Jean | Aug. 15, 1944 |
| 2,358,879 | Redcay | Sept. 26, 1944 |
| 2,370,195 | Ross et al. | Feb. 27, 1945 |
| 2,377,116 | Voorhies et al. | May 29, 1945 |
| 2,406,869 | Upham | Sept. 3, 1946 |
| 2,431,685 | Cade | Dec. 2, 1947 |